(12) United States Patent
Dudley et al.

(10) Patent No.: US 6,739,347 B2
(45) Date of Patent: May 25, 2004

(54) SYSTEM FOR SPIN-CLEANING CLOSED-END FILTER CARTRIDGES

(75) Inventors: David Edmond Dudley, San Jose, CA (US); Joseph D. Robertson, Fremont, CA (US)

(73) Assignee: Spin Clean Products, LLC, Fremont, CA (US)

( * ) Notice: Subject to any disclaimer, the term of this patent is extended or adjusted under 35 U.S.C. 154(b) by 250 days.

(21) Appl. No.: 09/939,223

(22) Filed: Aug. 25, 2001

(65) Prior Publication Data

US 2003/0037808 A1 Feb. 27, 2003

(51) Int. Cl.$^7$ ................................ B08B 3/00
(52) U.S. Cl. ................ 134/157; 134/138; 134/149; 134/137; 248/560; 248/200; 248/694; 269/1
(58) Field of Search ................ 134/137, 138, 134/149, 157, 153; 248/560, 200; 348/694; 269/1

(56) References Cited

U.S. PATENT DOCUMENTS

| | | | |
|---|---|---|---|
| 4,090,309 A | * 5/1978 | Rollins | 34/58 |
| 4,585,019 A | * 4/1986 | Jacobson | 134/57 R |
| 4,668,384 A | * 5/1987 | Holman | 210/797 |
| 5,330,065 A | * 7/1994 | Bradley | 211/163 |
| 5,989,419 A | 11/1999 | Dudley et al. | |
| 6,152,155 A | * 11/2000 | Milligan | 134/138 |
| 6,156,213 A | 12/2000 | Dudley et al. | |

* cited by examiner

*Primary Examiner*—M. Kornakov
(74) *Attorney, Agent, or Firm*—Richard B. Main

(57) ABSTRACT

The spindle assembly is self-centered on the end of the cylindrically shaped cartridge filter by a three-point grip on the perimeter. A similar spindle assembly is attached to the other end of the cartridge filter such that its axis of rotation is the same as the axis of rotation for the first spindle assembly. The tip of one spindle assembly is rested on the ground while the tip of the other spindle assembly is held by a user's hand. A pressurized stream of air or water is directed at the cartridge filter with the user's other hand such that the stream causes the whole to rotate. The speed of rotation is brought high enough to fling debris from the filter and thus clean it.

3 Claims, 2 Drawing Sheets

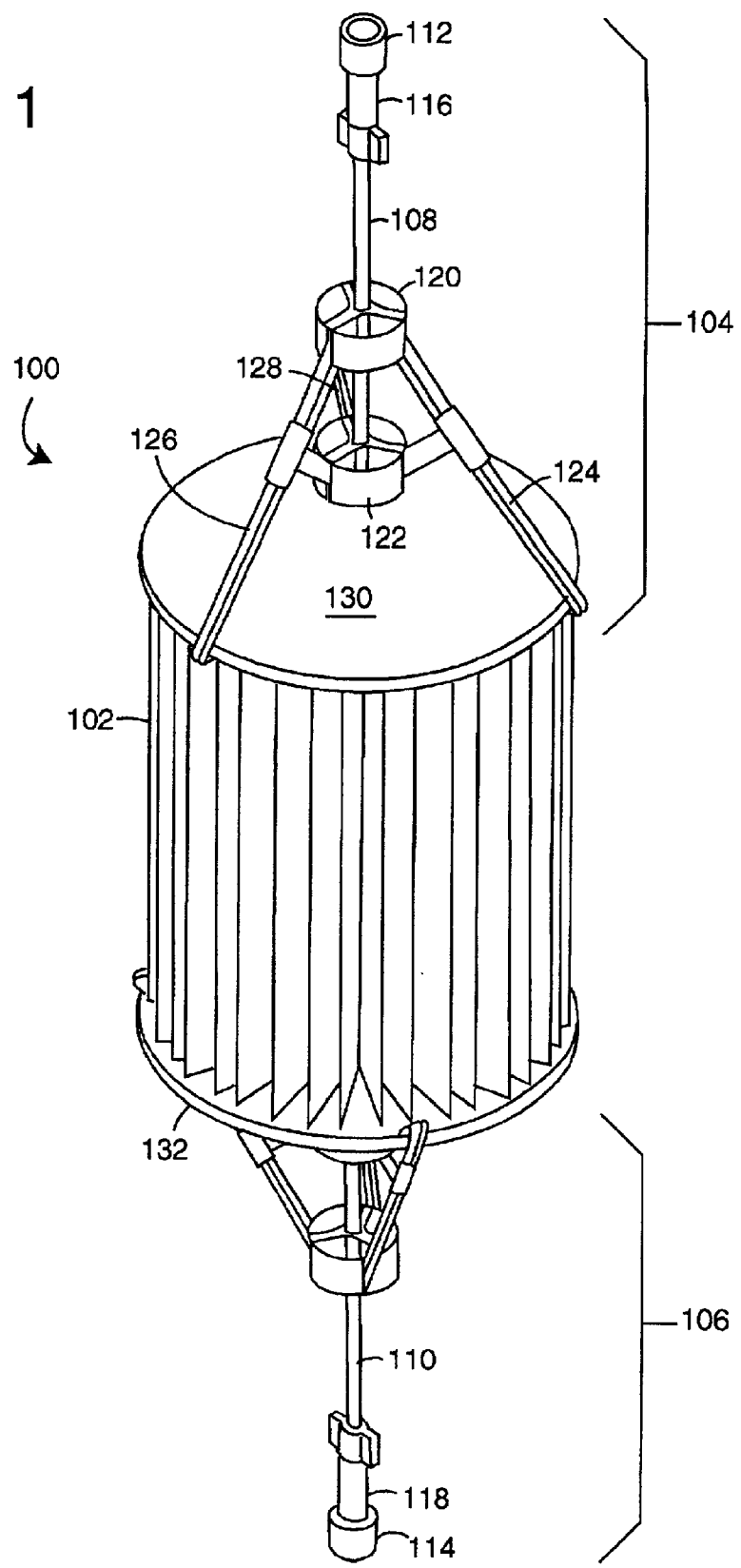

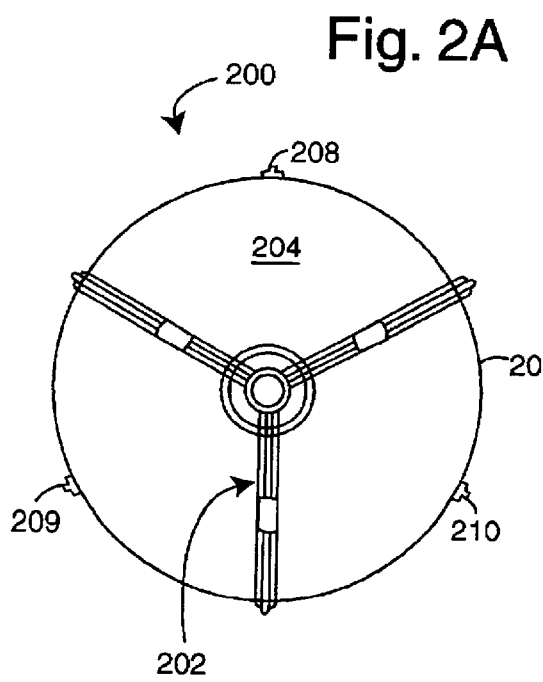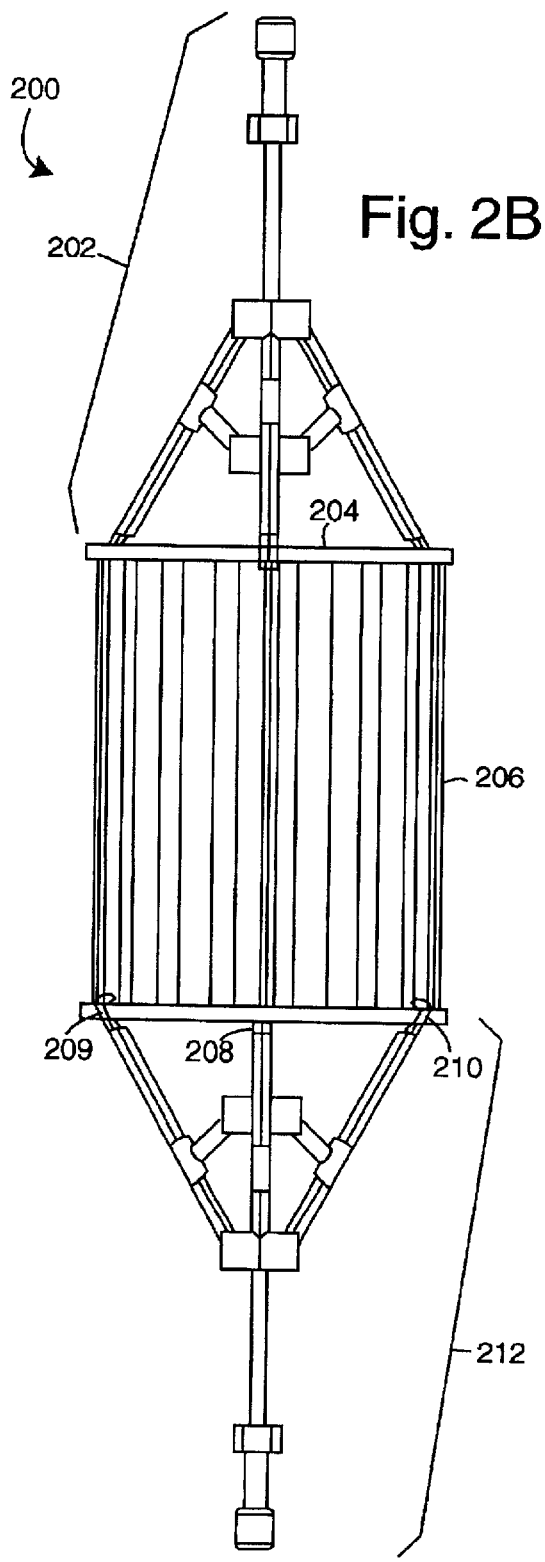

SYSTEM FOR SPIN-CLEANING CLOSED-END FILTER CARTRIDGES

BACKGROUND OF THE INVENTION

1. Field of the Invention

The present invention relates to filter cartridges, and more particularly to centrifugal cleaning equipment and methods for cylindrically shaped filter types that have no axial holes through their end plates.

2. Description of Related Art

Centrifugal force can be used to shed water and debris from a variety of objects. Some things are easier to spin than others, and some require a rotating mechanism to implement a fast enough and well-balanced spin.

The present inventor, David E. Dudley, describes the cleaning of water filter cartridges in two previous patents by spinning the filter cartridges to take advantage of centrifugal force. U.S. Pat. No. 5,989,419, issued Nov. 23, 1999, describes a spinner on which a dirty, removable pool filter can be mounted. A water jet from a hose is directed at the filter and it will spin on its own on the axle provided. The combination of the water jet and spinning of the filter causes filter cake to be washed and flung free. U.S. Pat. No. 6,156,213, issued Dec. 5, 2000, describes an in-situ spin-clean water filter. An enclosed filter is mounted on a pivot so it can easily spin but not allow internal water-bypass leakage. Strategically placed water jets inside can be turned on to cause the filter to be spun, e.g., after the enclosure has been drained. Both such Patents are incorporated herein by reference.

A problem occurs with some cartridge filters when trying to spin-clean them. Some cartridge filters don't have holes through the centers at both ends, and so a rotating rod or shaft cannot be run through. Trying to rotate from one side, or attaching and centering on one end hole is too troublesome and awkward.

SUMMARY OF THE INVENTION

Briefly, a spin-clean system embodiment of the present invention comprises two spindle assemblies, one each for gripping the ends of a closed-end cartridge filter. A method embodiment of the present invention for cleaning a closed-end cartridge filter begins by mounting a spindle assembly to one end of a cartridge filter. The spindle assembly is self-centered on the end of the cylindrically shaped cartridge filter by a three-point grip on the perimeter. A similar spindle assembly is attached to the other end of the cartridge filter such that its axis of rotation is the same as the axis of rotation for the first spindle assembly. The tip of one spindle assembly is rested on the ground while the tip of the other spindle assembly is held by a user's hand. A pressurized stream of air or water is directed at the cartridge filter with the user's other hand such that the stream causes the whole to rotate. The speed of rotation is brought high enough to fling debris from the filter and thus clean it.

An advantage of the present invention is a system is provided for the easy and effective cleaning of cartridge filters in the field.

Another advantage of the present invention is that a cleaning system is provided that allows filter cartridges to be reused.

A still further advantage of the present invention is that a method is provided for cleaning cartridge filters with closed ends.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 1 is a perspective view diagram of a spin-clean system embodiment of the present invention;

FIG. 2A is an end view of spin-clean system embodiment of the present invention; and FIG. 2B is a side-view of the spin-clean system of FIG. 2A.

DETAILED DESCRIPTION OF THE INVENTION

FIG. 1 represents a spin-clean system embodiment of the present invention, and is referred to herein by the general reference numeral 100. The system 100 is intended to clean a dirty cartridge filter 102 by centrifugal force. In particular, the filter 102 has no hole in one end through which a spinner axle like that described in U.S. Pat. No. 5,989,419, can be passed. In embodiments of the present invention, the cartridge filter 102 is clipped and held between an independent pair of spindle assemblies 104 and 106. Such spindle assemblies can be identical to one another, and this may be preferable in manufacturing and marketing to keep costs down.

Each spindle assembly 104 and 106 includes a threaded shaft 108 and 110 intended to spin with the cartridge filter 102. Each threaded shaft is terminated with a foot/handle bearing assembly 112 and 114 that allows either end to be rested on the ground and the other end held by hand. The system 100 rotates freely between these foot/handle bearing assemblies 112 and 114. A handle 116 and 118 helps a user grip the system.

Referring now to spindle assembly 104, an adjustable threaded hub 120 and a cap hub 122 can be positioned relative to one another by screwing the adjustable threaded hub 120 along the threads of threaded shaft 108. A set of three gripping arms 124, 126, and 128 are attached to the hubs 120 and 122 by pins and links. The other spindle assembly 106 is constructed the same way.

During use, an end 130 of the filter cartridge is gripped by the arms 124, 126, and 128, by first moving the hubs together and then moving them apart with the filter 102 in place. The cap hub 122 is attached such that it can be rotated on the shaft so the threaded hub 120 can be run up and down the threads on shaft 108. Another end 132 is gripped the same way by spindle assembly 106. The three-point gripping action helps the user center and balance the filter 102 before cleaning.

During cleaning, the filter 102 is spun at high speed, e.g., with an air hose for an air filter, or with a water hose for a water filter. The combination of the washing stream and the spinning helps dislodge and carry away any filter cake and debris.

FIGS. 2A and 2B are end and side views of a cleaning system 200 similar to system 100 (FIG. 1). A three-point spindle assembly 202 grips an end 204 of a closed-end cartridge filter 206. A set of fingertips 208–210 are visible in FIG. 2A and are part of a spindle assembly 212 on the other end. Here, in FIG. 2A, a method of attachment is shown in which the top and bottom spindle assemblies are set 60° apart from one another on the filter ends. In practice, they can be attached without regard to the position of the other end.

Preferred embodiments of the present invention are fabricated from non-marring, non-corroding materials, e.g., aluminum, polycarbonate, or ABS plastic. The outer pieces of the foot/handle bearing assemblies 112 and 114, and handles 116 and 118, can be made of relatively softer polyurethane rubber.

A method embodiment of the present invention for cleaning a closed-end cartridge filter begins by mounting a spindle assembly to one end of the cartridge filter. The spindle assembly is self-centered on the end of the cylindrically shaped cartridge filter by a three-point grip. A similar spindle assembly is attached to the other end of the cartridge filter such that its axis of rotation is the same as the axis of rotation for the first spindle assembly. The tip of one spindle assembly is rested on the ground while the tip of the other spindle assembly is held by a user's hand. A pressurized stream of air or water is directed at the cartridge filter with the user's other hand such that the stream causes the whole to rotate. The speed of rotation is brought high enough to fling debris from the filter and thus clean it.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A spin-cleaning system, comprising:

a pair of spindle assemblies for attachment to opposite ends of a cylindrically shaped cartridge filter, and providing for a cleaning action by centrifugal force;

a three-point gripping mechanism included in each of the pair of spindle assemblies and for providing a self-centering and self-balancing attachment to said filter cartridge;

a foot bearing disposed at one end of one of the pair of spindle assemblies and providing for ground support of the whole and a free-rotating action; and a handle bearing disposed at one end of the other of the pair of spindle assemblies and providing for user hand support of the whole and said free-rotating action;

wherein the pair of spindle assemblies are similar to one another and each comprises a set of three gripper arms for grasping a cartridge filter outside a perimeter of one end;

a threaded hub attached with pivots to each of the gripper arms and having a thread inside that runs along a shaft coaxial to an axis of rotation; and a cap hub fastened in a swivel to one end of said threaded shaft and attached to the gripper arms by links and for providing a closing and opening grip action by the gripper arms as the threaded hub is run along said threaded shaft.

2. The system of claim 1, further comprising:

a foot attached to a distal end of said threaded shaft for providing a supporting rest during use.

3. The system of claim 1, further comprising:

a handle attached to a distal end of said threaded shaft for providing a hand grip for a user.

* * * * *